US006483070B1

(12) United States Patent
Diehl et al.

(10) Patent No.: US 6,483,070 B1
(45) Date of Patent: Nov. 19, 2002

(54) ELECTRODE COMPONENT THERMAL BONDING

(75) Inventors: Gregory W. Diehl, Florence, SC (US); Michael C. McBennett, Lamar, SC (US)

(73) Assignee: The ESAB Group, Inc., Florence, SC (US)

(*) Notice: Subject to any disclaimer, the term of this patent is extended or adjusted under 35 U.S.C. 154(b) by 0 days.

(21) Appl. No.: 09/964,072

(22) Filed: Sep. 26, 2001

(51) Int. Cl.[7] .................................... B23K 10/00
(52) U.S. Cl. .............. 219/121.52; 219/119; 219/121.48
(58) Field of Search ........................ 219/121.59, 121.52, 219/121.48, 119, 74, 75

(56) References Cited

U.S. PATENT DOCUMENTS

| | | | | |
|---|---|---|---|---|
| 3,198,932 A | | 8/1965 | Weatherly | |
| 3,930,139 A | | 12/1975 | Bykhovsky et al. | |
| 4,766,349 A | | 8/1988 | Johansson et al. | |
| 4,843,206 A | | 6/1989 | Azuma et al. | |
| 5,097,111 A | * | 3/1992 | Severance, Jr. | 219/121.52 |
| 5,200,594 A | | 4/1993 | Okada et al. | |
| 5,628,924 A | | 5/1997 | Yoshimitsu et al. | |
| 5,857,888 A | | 1/1999 | Tada et al. | |
| 5,908,567 A | | 6/1999 | Sakuragi et al. | |
| 6,114,650 A | | 9/2000 | Marner et al. | |
| 6,130,399 A | | 10/2000 | Lu et al. | |
| 6,177,647 B1 | | 1/2001 | Zapletal | |
| 6,329,627 B1 | * | 11/2001 | Walters | 219/121.52 |

FOREIGN PATENT DOCUMENTS

JP 60-247491 A 12/1985

OTHER PUBLICATIONS

Thermodynamic Properties of Substances; Table 4.2.28 Phase Transition and Other Data for the Elements; Marks' Standard Handbook for Mechanical Engineers; pp. 4–58 and 4–59; 10th Edition; McGraw–Hill; Eugene A. Avallone and Theodore Baumeister III, Editors.

William D. Callister, Jr.; Chapter 9—Phase Diagrams; Materials Science and Engineering—An Introduction; pp. 247–272; Second Edition; John Wiley & Sons, Inc.

Osamu Taguchi and Yoshiaki Iijima; Reaction Diffusion In The Silver—Hafnium System; Journal of Alloys and Compounds; 1995; pp. 185–189; vol. 226.

* cited by examiner

*Primary Examiner*—Mark Paschall
(74) *Attorney, Agent, or Firm*—Alston & Bird LLP

(57) ABSTRACT

An electrode for supporting an arc in a plasma arc torch is provided and includes an emissive element for supporting the arc, which may be formed of hafnium; a relatively non-emissive member comprising a first metal including silver, which is positioned to circumscribe a front surface of the emissive element; and a metallic holder for holding the non-emissive member. The holder is in one embodiment made of a copper alloy including a major portion of copper and a minor portion of another metal, such as nickel. After assembly, the electrode is subjected to a heat treatment that causes a thermal bonding between the relatively non-emissive member and the metallic holder, which, during subsequent operation of the electrode, provides good thermal conduction away from the emissive element and improves the consumable life of the electrode. Advantageously, during the heating step, the nickel attenuates the eutectic reaction between the copper and the silver that would otherwise occur and allows bonding over a wide range of temperatures and heating cycle durations. In addition, the temperature at which bonding occurs between the non-emissive member and the holder is also raised. As a result, if desired, a thermal bond can also be formed between the hafnium emissive element and the non-emissive member during the same heating cycle, thus further promoting thermal conductivity of the electrode. In alternative embodiments, other metals and other configurations, such as the use of an intervening plating, powder or sleeve are used to raise, and provide a greater range for, the temperatures over which bonding occurs between the non-emissive element and the holder.

25 Claims, 7 Drawing Sheets

ELECTRODE COMPONENT THERMAL BONDING

FIELD OF THE INVENTION

The present invention relates to plasma arc torches and, more particularly, to a method of forming an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode that supports an arc that extends from the electrode to the workpiece in a transferred arc mode of operation. It is also conventional to surround the arc with a swirling vortex flow of gas, and in some torch designs it is conventional to also envelop the gas and arc with a swirling jet of water.

The electrode used in conventional torches of the described type typically comprises an elongate tubular member composed of a material of high thermal conductivity, such as copper or a copper alloy. One conventional copper alloy includes 0.5% of tellerium (tellerium has a melting temperature of 841° F.) to provide better machinability than pure copper. The forward or discharge end of the tubular electrode, known as a "holder", includes a bottom end wall having an emissive element embedded therein which supports the arc. The emissive element is composed of a material that has a relatively low work function, which is defined in the art as the potential step, measured in electron volts (ev), which permits thermionic emission from the surface of a metal at a given temperature. In view of its low work function, the emissive element is thus capable of readily emitting electrons when an electrical potential is applied thereto. Commonly used emissive materials include hafnium, zirconium, tungsten, and their alloys.

Some electrodes include a relatively non-emissive member or "separator", which is disposed about the emissive element and acts to prevent the arc from migrating from the emissive element to the copper holder. These non-emissive members are discussed in U.S. Pat. No. 5,023,425 to Severance, which is incorporated herein by reference. The thermal conductivity of electrodes is important for removing heat generated by the arc, which increases the usable life of the electrode. As such, the non-emissive member is also preferably formed from a highly thermally conductive metal, such as silver or silver alloys.

Many conventional electrodes are assembled by pressing the emissive insert into the metallic holder, or by pressing the emissive insert into the non-emissive member which is then pressed into the metallic holder. The interfaces between the press-fit emissive element, non-emissive member, and holder can negatively affect the thermal conductivity of the assembled electrode by creating a "step" in the thermal conductivity at the interface of adjoining parts. This is especially true where the adjoining surfaces do not fit together very closely. Brazing is sometimes used to ensure sufficient thermal and electrical conduction. However, the use of brazing materials adds additional steps to the manufacture of an electrode, and brazing materials typically have a low melting point, which is disadvantageous when attempting to bond to the emissive element, as discussed below.

In order to help thermal conduction over the interfaces of the emissive element, non-emissive member, and holder, the assignee of the present invention has developed a diffusion bonding technique described in a co-pending application with Ser. No. 09/773,847 ("the '847 application") entitled "Electrode Diffusion Bonding", which is incorporated herein by reference. In the co-pending '847 application, a post-assembly heating step is described that creates a diffusion bond between the non-emissive member and the metallic holder. The diffusion bond softens or smoothes the thermal interface between the two materials, while increasing the bond strength therebetween. As a result, the electrode has a longer operational life.

In the co-pending patent application Ser. No. 09/871,071 ("the '071 application"), which is also incorporated herein by reference, the assignee of the present invention has discovered that it is also sometimes desirable to improve the bond between the emissive element and non-emissive member by heating. The post-assembly heating step of the co-pending '847 application is particularly advantageous for improving the bond between materials such as silver (in the case of the non-emissive member) and copper (in the case of the holder), but the relatively high temperature resistance of the emissive element (which is typically hafnium) may cause the bond between the non-emissive member and the holder to be destroyed if any heat treatment of the emissive element was attempted. As set forth in the '071 application, a two stage assembly and heating process is provided wherein strong bonds are formed between the emissive element and non-emissive member and between the non-emissive member and metallic holder.

In particular, an emissive element, such as hafnium, is positioned in a non-emissive member, such as silver, and is heated to a temperature of between about 1700° F. and 1800° F. such that an intermetallic compound is formed between the hafnium and silver, thereby creating a strong and conductive bond. Thereafter, the emissive element and non-emissive member are bonded to a holder, such as copper, by way of a heating step that forms a eutectic alloy between the copper holder and the silver member. This heating step typically occurs between about 1400° F. and 1450° F. In particular, when copper and silver are heated together, a eutectic melting point is achieved (which is lower than the melting point of both pure silver and pure copper) at about 1432° F. This second heating process forms a strong and conductive thermal bond between the holder and the non-emissive member such that the resulting electrode includes thermal bonds between both the hafnium emissive element and the silver non-emissive member, and between the silver non-emissive member and the copper holder. Such an arrangement greatly enhances the thermal conductivity of the electrode by bonding the base materials of the components, which allows heat to be readily removed from the arc emitting element and thereby enhances the operational life of the electrode.

However, with the method of the '071 application, the heating steps for forming thermal bonds between the emissive element and the non-emissive member, and between the non-emissive member and the holder are conducted separately. In other words, the relatively low eutectic melting point between a silver member and a copper holder prevents heating to the much higher temperature that is necessary to form thermal bonds between the emissive element and the non-emissive member. The eutectic alloy formed between the silver member and the copper holder will simply melt away or evaporate if raised to a suitable hafnium/silver bonding temperature, leaving voids between the two members and preventing adequate thermal conduction.

In addition, the eutectic reaction that occurs between silver and copper occurs very rapidly at the eutectic temperature. Thus, if the heating process goes beyond the eutectic temperature for even a short period of time, the silver and copper can quickly intermix and destroy the other advantageous properties of those materials, such as the non-emissivity of silver. On a commercial production basis, the tight temperature tolerances can be difficult to achieve and consistent manufacture is challenging.

Thus, separate heating steps, as presented in an embodiment of the invention of the '071 application, cause expense and delay in manufacturing costs that would desirably be avoided. In addition, the copper/silver eutectic reaction can be difficult to control on a commercial scale. Thus, there is a need in the industry for an electrode of the general type discussed above wherein only one heating step is required to form thermal bonding between the non-emissive member and the holder and, if desired, between the emissive element and the non-emissive member. In addition, there is a need for a method of commercial manufacture that easily accommodates thermal bonding between the non-emissive separator and the holder.

SUMMARY OF THE INVENTION

The present invention meets these objectives and others by the use of a third metal, such as nickel, at the interface of the copper holder and silver non-emissive member. In a particular embodiment, the copper of the holder is alloyed-.with nickel, which attenuates the eutectic reaction between the silver and the copper. The nickel causes the eutectic reaction to be slowed such that a thermal bond can be formed between the holder and the non-emissive member at a higher temperature than the eutectic temperature of pure silver and pure copper. This bond can be formed over a greater temperature range and during a higher-temperature heating step that can be used also to form thermal bonding between the hafnium emissive element and the silver non-emissive member. As a result, electrodes according to the present invention can advantageously be formed with bonding both between the non-emissive member and the holder and between the emissive element and the non-emissive member during only one heating cycle.

The third metal can be alloyed in the metallic holder and/or can also be alloyed in the metal of the non-emissive member. A preferred composition is about 10% nickel by weight of the metallic holder with the remainder comprising copper. However, it is not necessary for the third metal to be alloyed, and either of the adjoining components can instead be plated. In addition, the third metal can be presented in powdered form between the non-emissive member and the emissive element, or by way of a thin sleeve that surrounds the non-emissive member and separates the non-emissive member from the holder. In addition, it is not necessary that the third metal comprises nickel and it may comprise at least one of the group consisting of zinc, iron, cobalt and chromium. The first metal may also comprise sterling silver.

Thus, the present invention provides electrodes and methods of making electrodes having stronger bonds between the elements thereof, which improves the strength and operational life span of the electrodes. In particular, these electrodes can be manufactured inexpensively and relatively quickly with only a single heating step. Furthermore, the methods of making electrodes according to the present invention allow the formation of electrodes that do not require brazing materials between the emissive element, non-emissive member, or metallic holder.

BRIEF DESCRIPTION OF THE DRAWINGS

Figure 1:
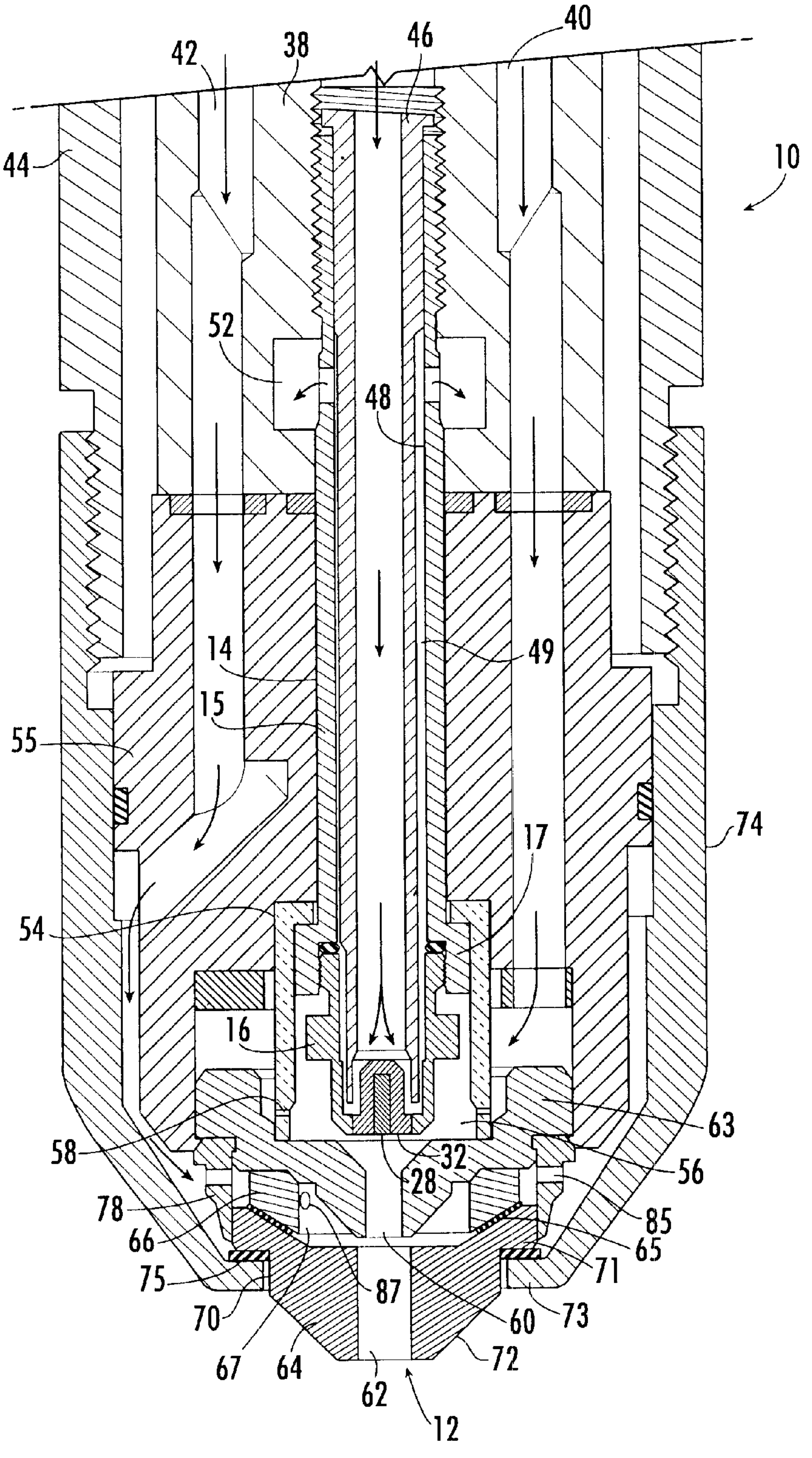
Figure 2:
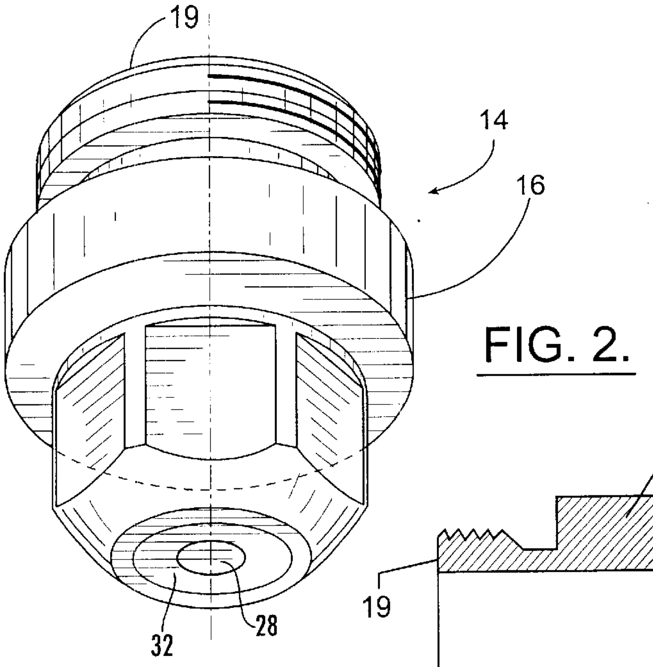
Figure 3:
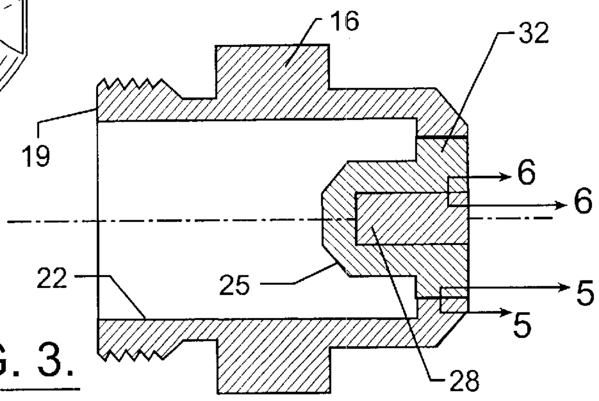
Figure 4:
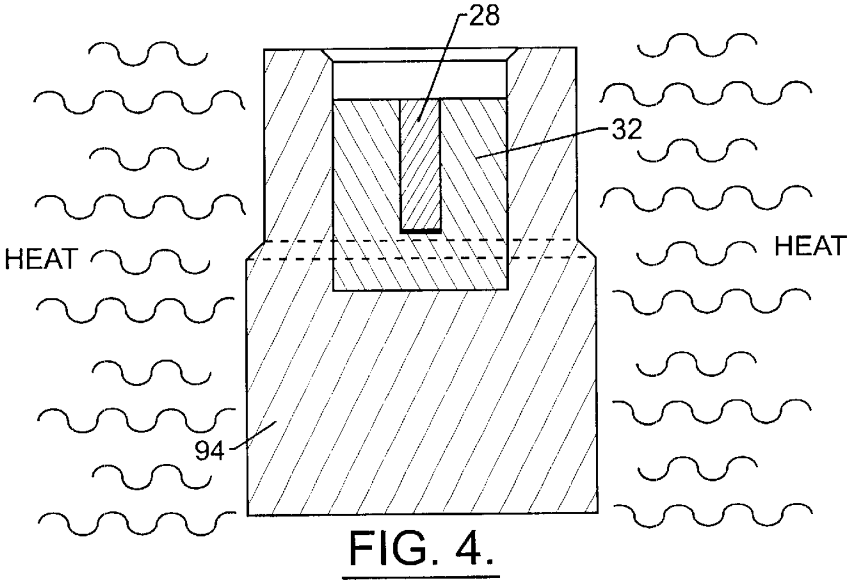
Figure 5:
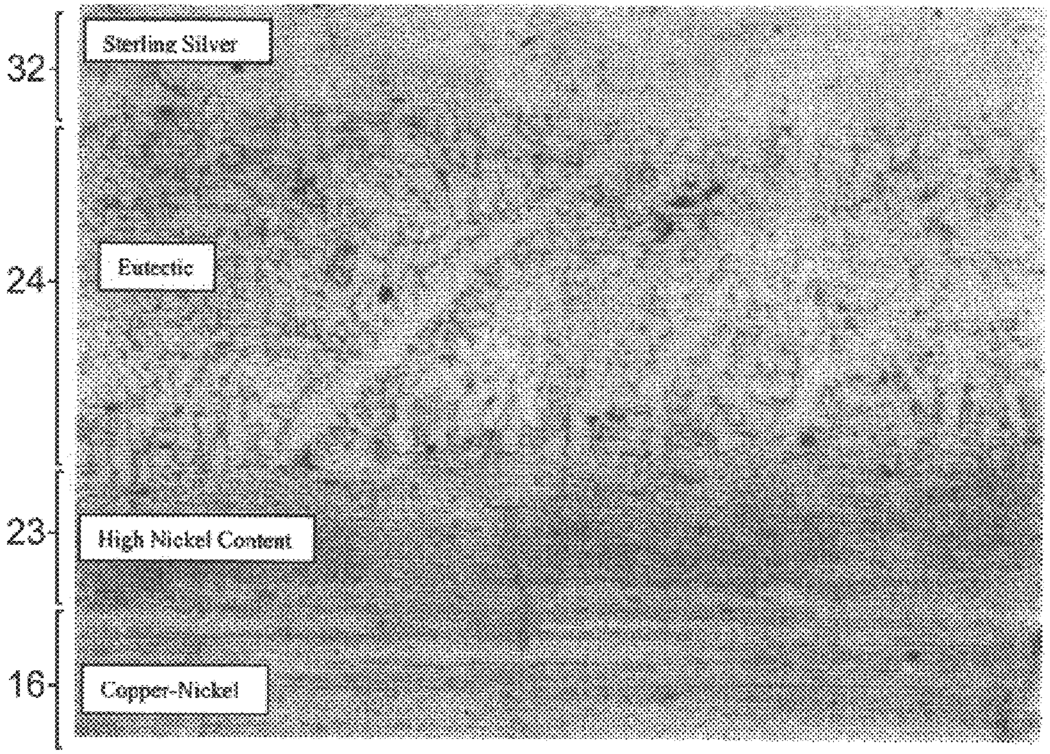
Figure 6:
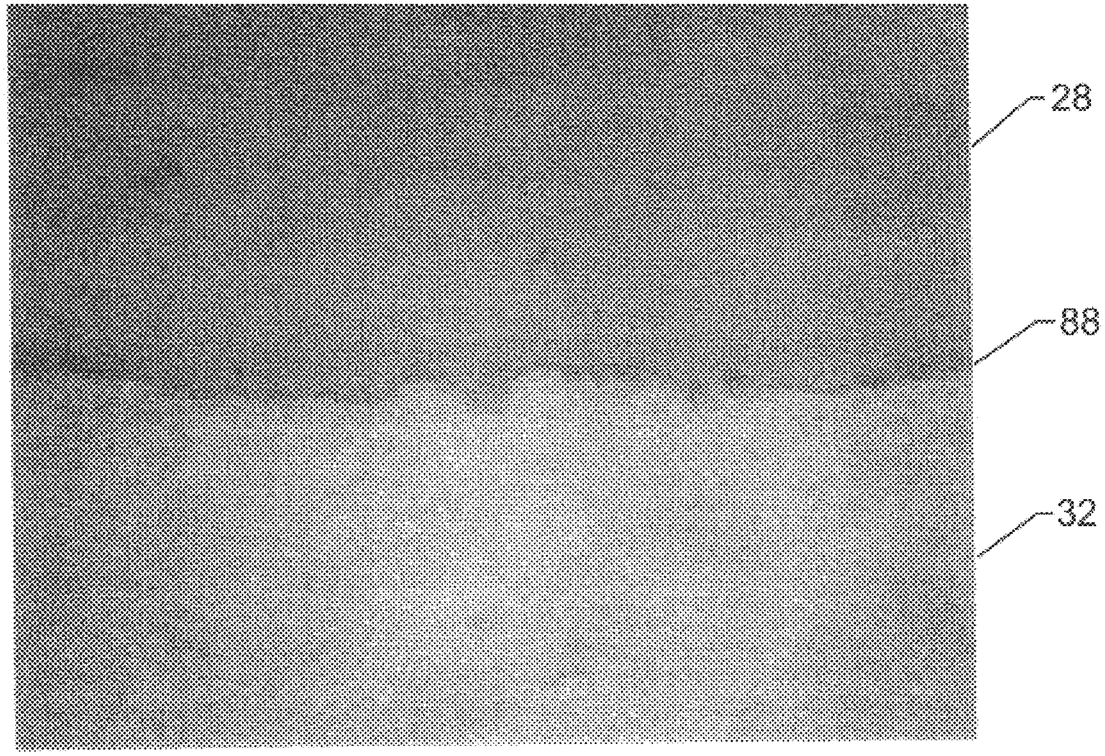
Figure 7:
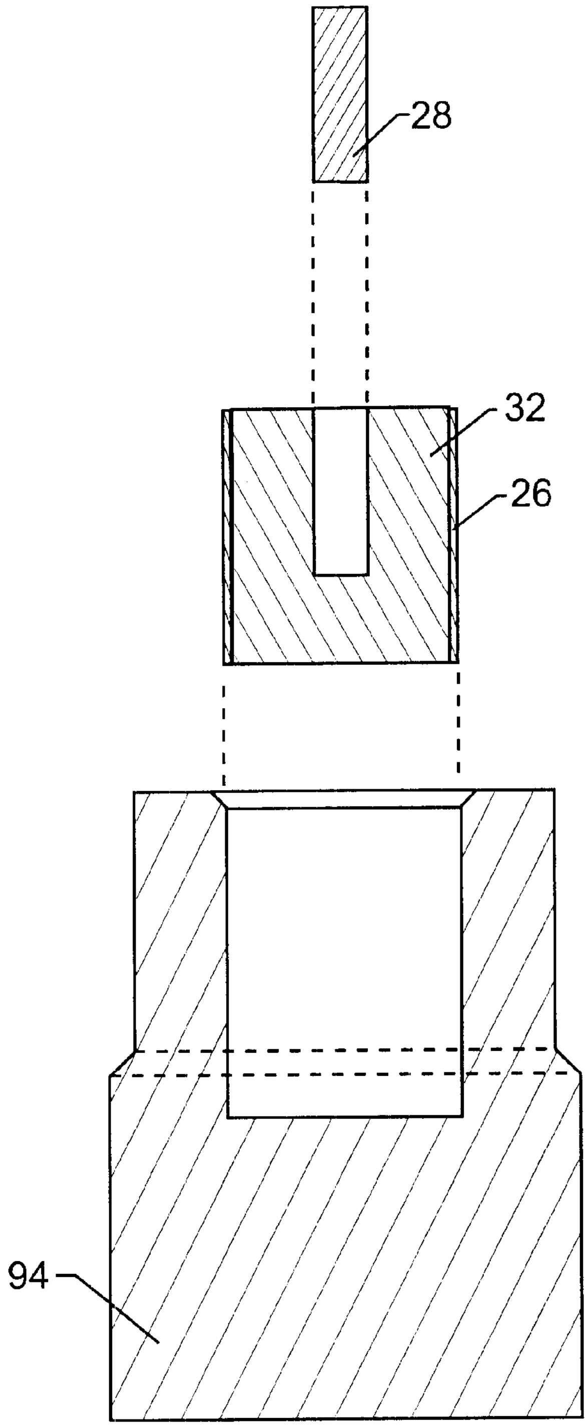
Figure 8:
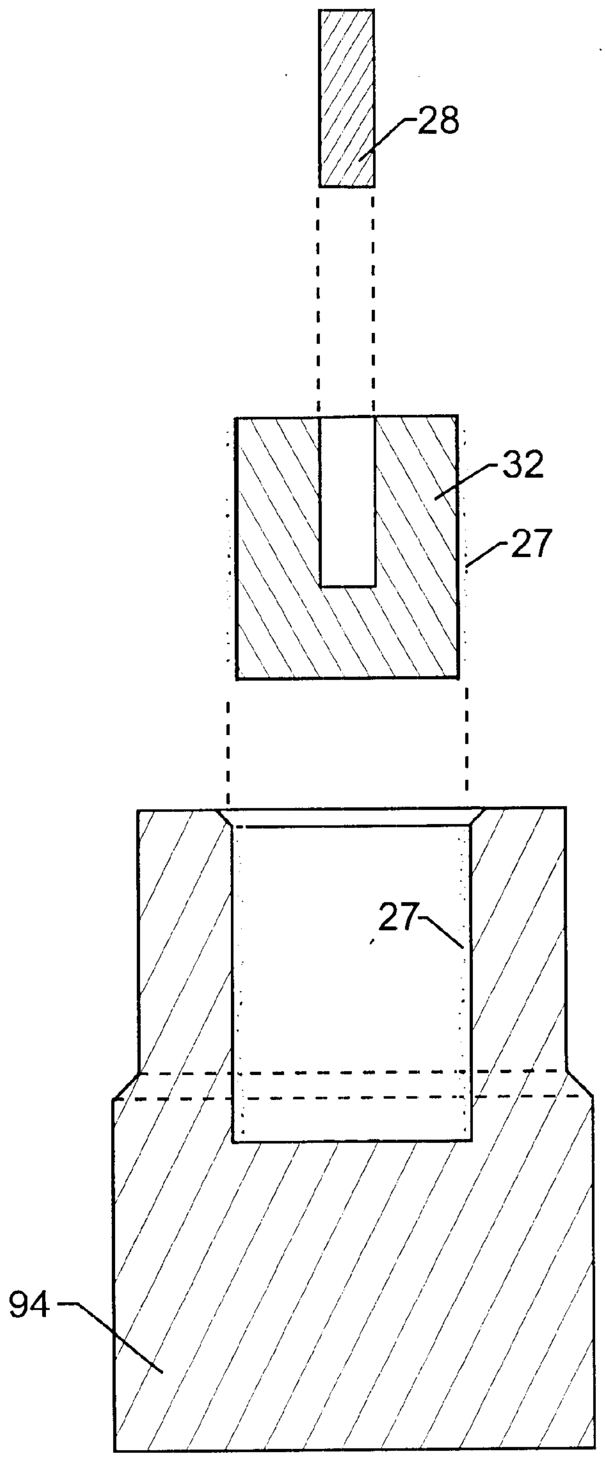

Having thus described the invention in general terms, reference will now be made to the accompanying drawings, which are not necessarily drawn to scale, wherein:

FIG. 1 is a sectioned side elevational view of a plasma arc torch which embodies the features of the present invention;

FIG. 2 is an enlarged perspective view of an electrode in accordance with the present invention;

FIG. 3 is an enlarged sectional view of an electrode in accordance with the present invention;

FIGS. 4 illustrates a heating step of a preferred method of fabricating the electrode in accordance with the invention;

FIG. 5 is a greatly enlarged sectional photograph of the electrode of the present invention seen along lines 5—5 of FIG. 3;

FIG. 6 is a greatly enlarged sectional photograph of the electrode of the present invention as seen along lines 6—6 of FIG. 3;

FIG. 7 is an alternative embodiment of the invention;

FIG. 8 is another alternative embodiment of the invention; and

Figure 9:
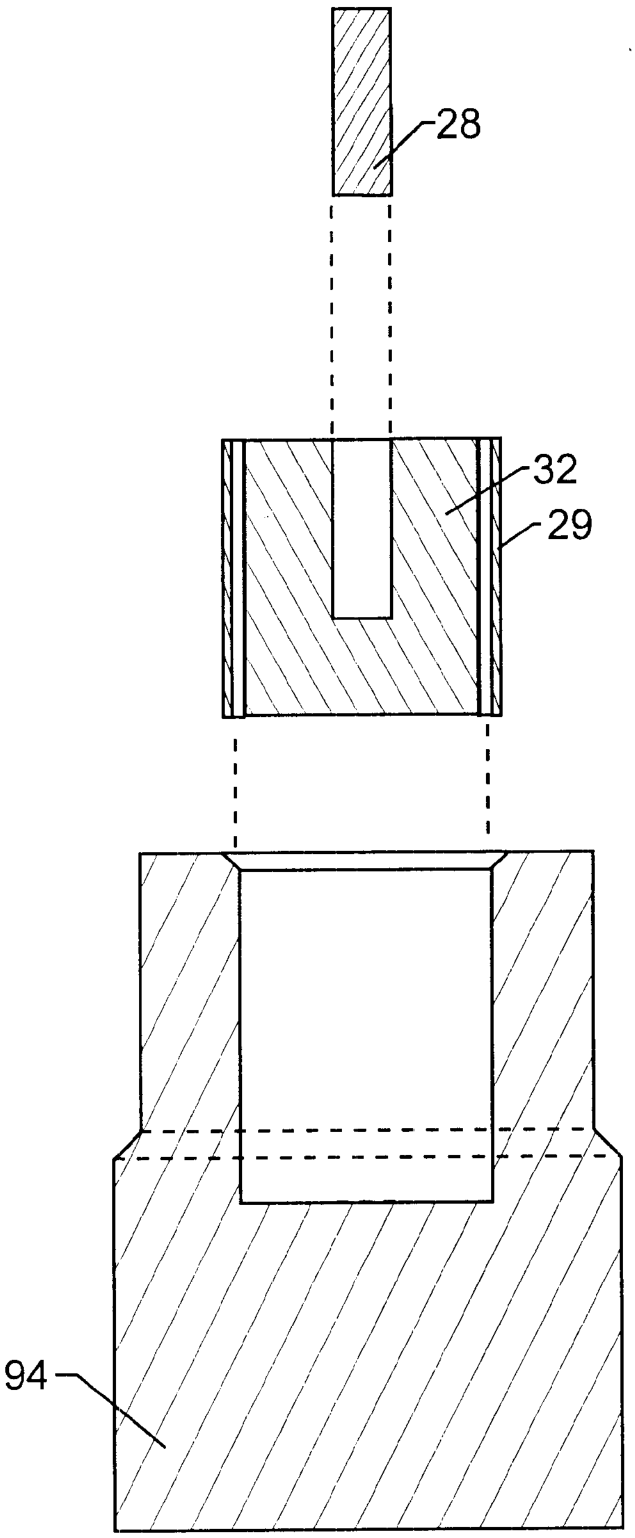

FIG. 9 is yet another alternative embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Electrode Construction

With reference to FIGS. 1–3, a plasma arc torch 10 embodying the features of the present invention is depicted. The torch 10 includes a nozzle assembly 12 and a tubular electrode 14. The electrode 14 preferably is made of copper or a copper alloy as discussed below, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is open at the rear end 19 thereof such that the holder is of cup-shaped configuration and defines an internal cavity 22. A generally cylindrical cavity is formed in the front end of the holder 16. A relatively non-emissive member 32 is positioned in the cylindrical cavity and is disposed coaxially along the longitudinal axis.

An emissive element or insert 28 is positioned in the non-emissive member 32 and is disposed coaxially along the longitudinal axis. More specifically, the emissive element 28 and the non-emissive member 32 form an assembly wherein the emissive element is secured to the non-emissive member. An intermetallic compound, which is effected by heating the emissive element and the separator, can be interposed therebetween as discussed more fully below. The emissive element 28 is composed of a metallic material having a relatively low work function, such as in a range of about 2.7 to 4.2 ev, so as to be capable of readily emitting electrons upon an electrical potential being applied thereto. Suitable examples of such materials are hafnium, zirconium, tungsten, and mixtures thereof.

The relatively non-emissive member 32 is composed of a metallic material having a work function that is greater than that of the material of the holder 16, according to values presented in Smithells Metal Reference Book, 6th Ed. More specifically, it is preferred that the non-emissive member 32 be composed of a metallic material having a work function of at least about 4.3 ev. In a preferred embodiment, the non-emissive member 32 comprises silver, although other metallic materials, such as gold, platinum, rhodium, iridium, palladium, nickel, and alloys thereof, may also be used consistent with the formation process discussed below. The selected material for the separator 32 should have high thermal conductivity, high resistance to oxidation, high melting point, high work function, and low cost. Although it is difficult to maximize all of these properties in one material, silver is preferred due to its high thermal conductivity.

For example, in one particular embodiment of the present invention, the non-emissive member 32 is composed of a silver alloy material comprising silver alloyed with about 0.25 to 10 percent of an additional material selected from the group consisting of copper, aluminum, iron, lead, zinc, and alloys thereof. The additional material may be in elemental or oxide form, and thus the term "copper" as used herein is intended to refer to both the elemental form as well as the oxide form, and similarly for the terms "aluminum" and the like. Sterling silver is a particularly preferred material (which has a melting point of about 640° F.) because it has a "plastic stage" during heating that can promote bonding with a hafnium emissive element 28. In addition, it is not necessary that the non-emissive member 32 be machined from a solid blank, and the member may be formed from compressed powder, such as a silver/nickel mixture.

As shown in FIG. 4, a generally cylindrical blank 94 of copper or, in one preferred embodiment, copper alloy is provided having a generally cylindrical bore formed therein such as by drilling in the front face along the longitudinal axis so as to form the cavity described above. The emissive element 28 and non-emissive member 32 can then be assembled into the holder blank 94. It is not necessary that these components be assembled in the configuration shown in FIG. 4 in a particular order and, for example, the non-emissive member 32 and emissive element 28 can first be assembled with each other and then positioned together in the blank 94. Alternatively, the non-emissive member 32 can be first placed in the blank 94 and the emissive element 28 then placed in the non-emissive member. Nor is it necessary that the inner and outer diameters be formed so that an interference press-fit is obtained, although such a press-fit arrangement may be advantageous during subsequent heat treating (as discussed below) to avoid inadvertent disassembly of the various components.

The copper that is conventionally used in holders 16 of this type is advantageously alloyed, in one embodiment of the present invention, with nickel. While the amount of nickel that is employed in the copper alloy can be varied, it has been determined that nickel that is alloyed in the holder to at least about 5% by weight is a preferred composition. About 10% by weight is a particularly preferred composition (CDA706) and has a melting point of about 2100° F. However, there are other compositions that could be used including 20%, 30% and even 60% nickel (Monel). Alloys known as "nickel-silvers" could also be used (these materials most often are copper/nickel/zinc alloys that do not contain any silver). Other elements such as iron and aluminum could also be added to the copper/nickel alloy. In addition, elements such as iron, cobalt or chromium may be used in place of the nickel to achieve the same effect discussed below.

After assembly, the components are then subjected to a heating cycle that heats the cylindrical blank 94, non-emissive member 32 and emissive element 28, and which results in improved properties and life span of the electrode. The heating process could also be performed after further machining steps are performed on the cylindrical blank 94, as discussed below. The exact heating process is dependent on the material used in the emissive element 28, the material used in the non-emissive member 32 and the material used for the holder 16. An induction heating unit or a conventional furnace can be used to perform the heating process and an inert atmosphere, such as nitrogen, may be used during heating.

Even though pure silver has a melting point of 1761° F. and pure copper has a melting point of 1984° F., when the two materials are heated together, a eutectic reaction occurs which causes a liquid alloy to form at about 1432° F. This reaction can occur very quickly and, when this temperature is exceeded, the copper and silver readily migrate within each other, which can cause even more of a eutectic reaction and create an intermixed liquid phase. This intermixng can lead to decreased electrode performance because the non-emissive characteristic of the silver is lost.

The inventors have discovered that when nickel is alloyed with the copper, the eutectic reaction is suppressed or attenuated and much higher heating temperatures can be achieved. A cross-sectional photograph of the resulting structure is shown in FIG. 5. In this embodiment, the holder 16 is formed of a copper alloy having 10% nickel by weight alloyed therein. Pure nickel has a melting point of about 2,651° F. The non-emissive member 32 is formed of sterling silver (which is 92.5% silver by weight and 7.5% copper). Between these two elements, two distinct phases can be seen. First, a region of high nickel content 23 is adjacent to the copper/nickel alloy of the holder 16. A region of eutectic alloy 24 is seen between the region of high nickel content 23 and the sterling silver non-emissive member 32. This region of eutectic alloy 24 contains mostly silver and copper, although may also include some nickel.

Although not wishing to be bound by theory, the inventors believe that, as the heating progresses, copper migrates from the holder 16 to the region of eutectic alloy 24 and leaves behind the nickel in the region of high nickel-content 23. This region of high nickel content 23 is believed to be important in controlling the rate that the copper/silver eutectic alloy forms. In particular, it is believed that the region of high nickel content 23 forms a barrier to more copper transfer into the region of eutectic alloy 24, effectively slowing the reaction. This slows the exchange of both copper and silver into the region of eutectic alloy 24. In addition, it is believed that, as the temperature is raised even further, the extra nickel adjacent to the region of eutectic alloy 24 progressively melts and joins the eutectic solution, which in turn raises the melting temperature of the solution. An alternative way to consider this phenomenon is to say that the solution is kept on the brink of solidifying. As an added benefit, copper/nickel alloy expands less than silver and copper during heating. Silver expands more than hafnium and so the copper/nickel helps to restrain the silver and does more to prevent the hole in the silver surrounding the hafnium from expanding than does a pure copper holder, thus maintaining better contact between the silver and the hafnium.

Even though the initial bond is formed very rapidly, the reaction slows markedly over time as the region of high nickel content 23 becomes thicker. Because of this characteristic, much flexibility can be provided when manufacturing electrodes according to this type. It has been determined that a temperature of at least about 1470° F. is necessary to begin the reaction, but beyond that temperature there is not as much need for control compared to pure copper/silver electrodes. In particular, the electrode can be raised to a temperature of at least about 1505° F. for about one hour. At this temperature range and time combination, a thin intermetallic compound is formed between the emissive element 28 and the non-emissive member 32. Of course, the thickness of any resultant intermetallic compound can be the result of many factors beyond furnace temperature, including electrode geometry and the duration of the heating cycle.

An intermetallic compound 88 between an emissive element 28 made of hafnium and a non-emissive member 32 made of silver is shown in FIG. 6. The intermetallic compound 88 provides a strong bond between the emissive element 28 and the non-emissive member 32 and the thickness of the intermetallic compound shown is about 0.00015". The intermetallic compound 88 is a new material having unique properties different from both the materials forming the emissive element 28 and the non-emissive member 32. Although not wishing to bound by theory, the intermetallic compound is believed to include both AgHf and $AgHf_2$.

It is not necessary in all cases for the electrode to have such an intermetallic compound formed, nor is the thickness of the intermetallic compound necessarily restricted to that illustrated in FIG. 6. Depending in part on the current rating of the torch in which the electrode will be used, it may be more preferable not to have any intermetallic layer formed. In other torches, it can be advantageous to have an intermetallic compound layer having a thickness of about 0.0002", which can be formed at a temperature of about 1466° F. for one hour. At thicknesses above about 0.006"–0.008", the lifetime of the electrodes may actually be shortened because the thermal conductivity of the intermetallic compound is relatively high. As a result, increased thickness decreases the amount of thermal conduction and thus decreases electrode life.

Referring back to FIG. 3, a cross-sectional view of a completed electrode according to the present invention is shown. To complete the fabrication of the holder 16 the rear face of the cylindrical blank 94 is machined to form an open cup-shaped configuration defining the cavity 22 therein. Advantageously, the cavity 22 is shaped so as to define a cylindrical post 25. In other words, the internal cavity 22 is formed, such as by trepanning or other machining operation, to define the cylindrical post 25. The external periphery of the cylindrical blank 94 is also shaped as desired, including formation of external threads at the rear end of the holder for connection to the torch as discussed below. Finally, the front face of the blank 94 and the end faces of the emissive element 28 and non-emissive member 32, respectively, are machined so that they are substantially flat and flush with one another, as shown in FIG. 3.

Advantageously, at least a portion of the non-emissive member 32 is exposed to the internal cavity 22. As discussed below, the electrode is cooled by the circulation of a liquid cooling medium such as water, through the internal cavity 22. The non-emissive member 32 is exposed during the trepanning or other machining operation to be in contact with the liquid cooling medium, which greatly enhances cooling of the electrode. The exposure of the non-emissive member 32 to the liquid cooling medium is especially advantageous when using a copper/nickel alloy for the holder 16 because the addition of nickel to the copper holder dramatically decreases the thermal conductivity of the resultant metal. In particular, if 10% nickel is alloyed into the copper holder, the thermal conductivity of the resultant alloy is lowered by approximately 90% relative to pure copper. However, because the highly thermally-conductive, silver non-emissive member 32 is directly exposed to the cooling water, heat can be conducted away from the emissive element 28 without all of the heat having to travel through the holder 16.

The favorable function of a third metal may be provided in other configurations such as, for example, when nickel is alloyed in the silver non-emissive member 32 and not the holder 16. Further embodiments of the invention are illustrated in FIGS. 7, 8 and 9. In FIG. 7, an embodiment is illustrated wherein a third metal for attenuating the eutectic reaction between copper and silver is provided in the form of a plating 26 on the outer surface of the non-emissive member 32. In other words, it is not necessary for the nickel of the preceding embodiments to be alloyed in either the holder blank 94 or the non-emissive member 32, and the same function may be achieved by a plating 26 of nickel on the outer surface of the non-emissive member 32 or, although not illustrated, on the inner surface of cylindrical cavity of the blank 94.

In FIG. 8, the third metal is presented as a powder 27, which is dispersed over the outer surface of the non-emissive member 32 and the inner surface of the blank 94. Once again, in this embodiment, the third metal can be nickel and the non-emissive member 32 and the holder 94 are not necessarily alloyed with the third metal.

Finally, in FIG. 9, the third metal is presented by way of a sleeve 29 that, once inserted in the blank 94, surrounds and contacts the non-emissive member 32 and contacts the non-emissive member so as to separate it from the holder blank 94.

Torch Construction

With reference again to FIG. 1, the electrode 14 is mounted in a plasma torch body 38, which includes gas and liquid passageways 40 and 42, respectively. The torch body 38 is surrounded by an outer insulated housing member 44. A tube 46 is suspended within the central bore 48 of the electrode 14 for circulating a liquid cooling medium, such as water, through the electrode 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 38 and to a drain hose (not shown). The passageway 42 directs injection water into the nozzle assembly 12 where it is converted into a swirling vortex for surrounding the plasma arc, as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14. The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 that defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

Many modifications and other embodiments of the invention will come to mind to one skilled in the art to which this invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An electrode for supporting an arc in a plasma arc torch, said electrode comprising:

- an emissive element comprising an emissive material and defining a front surface for supporting the arc;
- a relatively non-emissive member comprising a first metal including silver and which is positioned to circumscribe the front surface of the emissive element;
- a metallic holder for holding the non-emissive member and defining an interface therewith where the non-emissive member is thermally bonded to the metallic holder, the holder comprising a second metal including copper; and
- a third metal present at the interface of the metallic holder and the non-emissive member which is capable of attenuating any eutectic reaction between the silver of the first metal and the copper of the second metal when the metallic holder and non-emissive member are thermally bonded together.

2. An electrode as defined in claim 1 wherein the third metal is alloyed in at least one of the non-emissive member and the metallic holder.

3. An electrode as defined in claim 2 wherein the third metal is alloyed in the metallic holder.

4. An electrode as defined in claim 3 wherein the third metal is nickel which is alloyed in the metallic holder to at least about 5% by weight.

5. An electrode as defined in claim 4 wherein the nickel is about 10% by weight of the metallic holder.

6. An electrode as defined in claim 1 wherein the third metal is in a powdered form.

7. An electrode as defined in claim 1 wherein the third metal is plated on an outer surface of an emissive element.

8. An electrode as defined in claim 1 wherein the third metal is in the form of a separator member positioned around the emissive element.

9. An electrode as defined in one of claim 2, 3, 6, 7, or 8 wherein the third metal comprises nickel.

10. An electrode as defined in one of claim 2, 3, 6, 7, or 8 wherein the third metal comprises at least one of the group consisting of zinc, iron, cobalt and chromium.

11. An electrode as defined in claim 1 wherein the first metal comprises sterling silver.

12. An electrode for supporting an arc in a plasma arc torch, said electrode comprising:

- an emissive element comprising an emissive material and defining a front surface for supporting the arc;
- a relatively non-emissive member comprising a material that is less emissive than the emissive element and which is positioned to circumscribe the front surface of the emissive element and prevent the arc from detaching from the emissive element; and
- a metallic holder for holding the non-emissive member and the emissive element, the holder comprising a metal alloy including,
  - a major portion of an electrically conductive metal having a predetermined melting point, and
  - a minor portion of a metal having a melting point higher than that of the metal of the major portion.

13. An electrode as defined in claim 12 wherein the major portion of the metal alloy of the metallic holder comprises copper.

14. An electrode as defined in claim 12 wherein the minor portion of the metal alloy of the metallic holder comprises nickel.

15. An electrode as defined in claim 14 wherein the metal alloy of the metallic holder comprises at least about 5% nickel by weight.

16. An electrode as defined in claim 15 wherein the nickel is about 10% by weight of the metallic holder.

17. An electrode as defined in claim 12 wherein the minor portion of the metal alloy of the metallic holder comprises at least one of the group consisting of iron, cobalt and chromium.

18. An electrode as defined in claim 12 wherein the electrode defines a rear cavity and wherein the non-emissive member defines at least part of the rear cavity.

19. An electrode for supporting an arc in a plasma arc torch, said electrode comprising:

- an emissive element comprising an emissive material and defining a front surface for supporting the arc;

a relatively non-emissive member comprising silver and which is positioned to circumscribe the front surface of the emissive element; and a metallic holder for holding the non-emissive member and the emissive element, the holder comprising a metal alloy including both copper and nickel.

20. An electrode as defined in claim 19 wherein the relatively non-emissive member comprises sterling silver.

21. An electrode as defined in claim 19 wherein the metallic holder comprises at least about 5% nickel by weight.

22. An electrode as defined in claim 21 wherein the nickel is about 10% by weight of the metallic holder.

23. A method of fabricating an electrode adapted for supporting an arc in a plasma arc torch, said method comprising the steps of:

assembling together;

an emissive element comprising an emissive material and defining a front surface for supporting the arc;

a relatively non-emissive member comprising a material that is less emissive than the emissive element and which is positioned to circumscribe the front surface of the emissive element; and a metallic holder for holding the non-emissive member and the emissive element, the holder comprising a metal that is different in composition than the material of the non-emissive member; and then heating the assembly only once to a temperature sufficient to form brazeless thermal bonding between the peripheral surface of the emissive element and the non-emissive member and between the non-emissive member and the metallic holder.

24. A method of fabricating an electrode as defined in claim 23 wherein the emissive element is first placed in the non-emissive member and the non-emissive member is then placed in contact with the holder.

25. A method of fabricating an electrode as defined in claim 23 wherein the non-emissive member is first placed into the holder and the emissive element is then placed in the non-emissive member.

* * * * *